No. 732,539. PATENTED JUNE 30, 1903.
S. FYFE.
FILLING, CORKING, AND LABELING BOTTLES.
APPLICATION FILED DEC. 3, 1901. RENEWED DEC. 3, 1902.
NO MODEL. 5 SHEETS—SHEET 1.
Fig. 2.
Fig. 3.
Fig. 1.
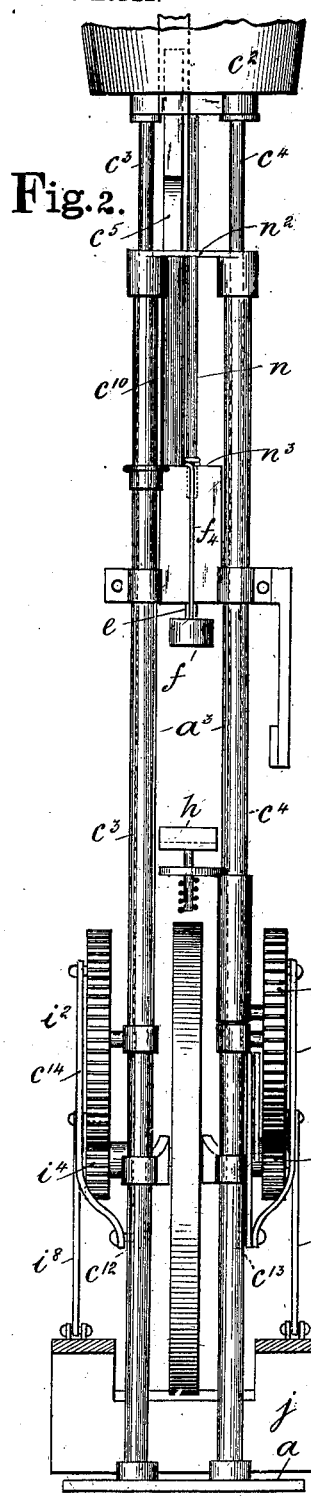
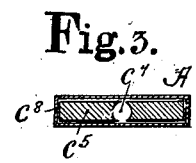
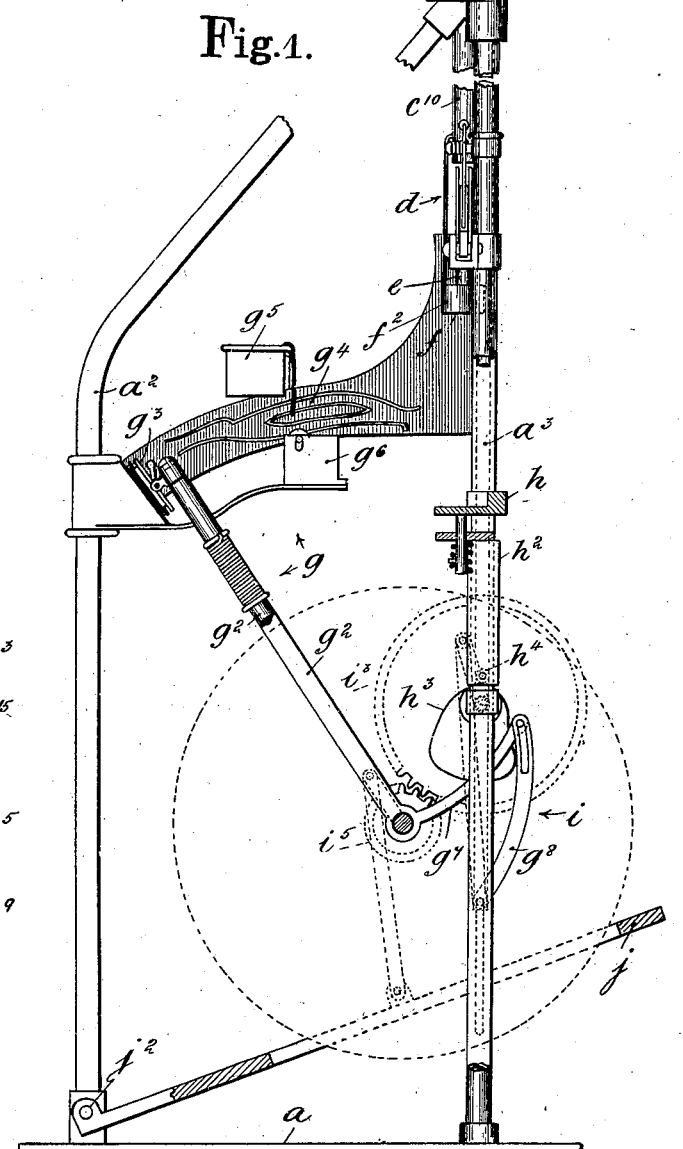
Witnesses
Geo Furry
Harry Davis
Inventor
Samuel Fyfe

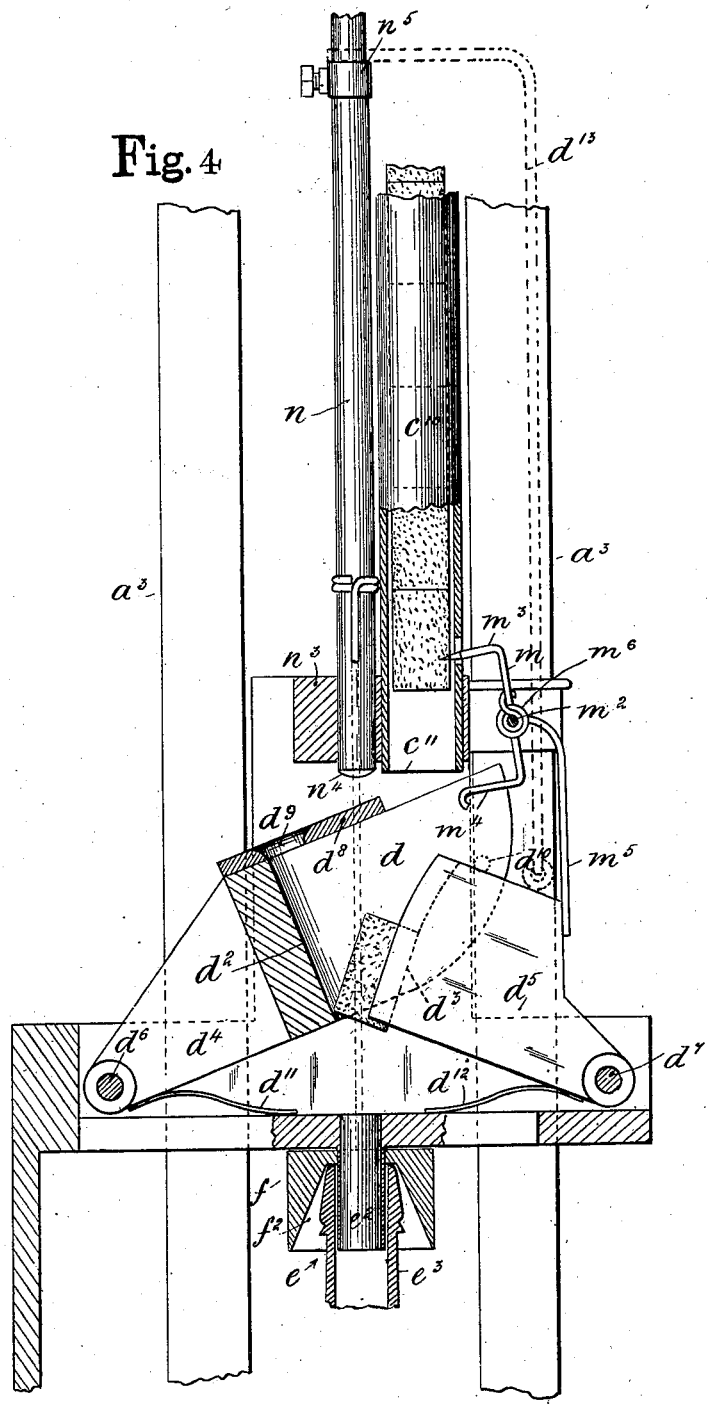

No. 732,539. PATENTED JUNE 30, 1903.
S. FYFE.
FILLING, CORKING, AND LABELING BOTTLES.
APPLICATION FILED DEC. 3, 1901. RENEWED DEC. 3, 1902.
NO MODEL. 5 SHEETS—SHEET 3.
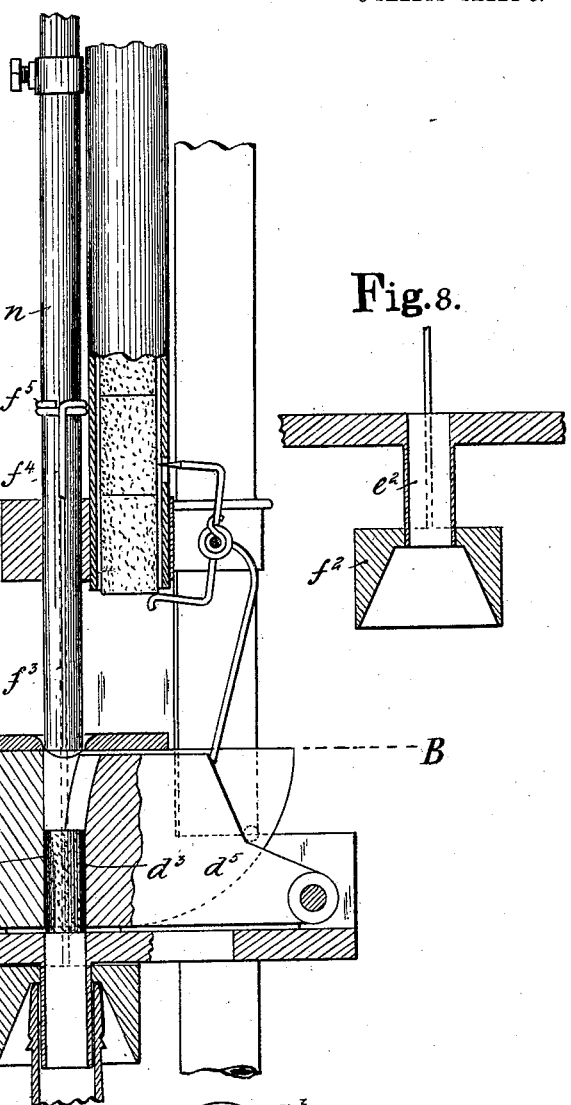
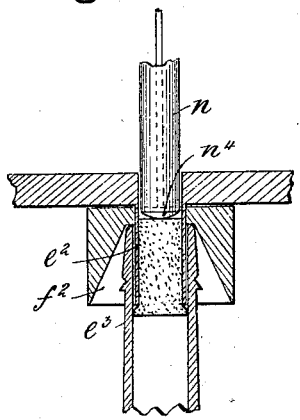
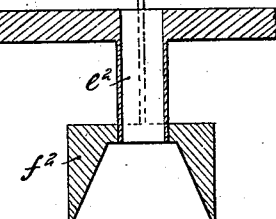
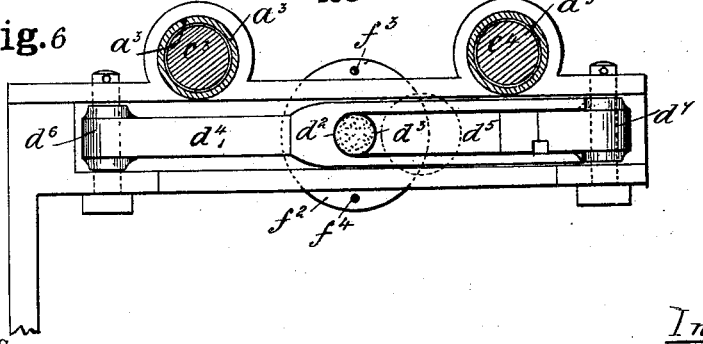

No. 732,539. PATENTED JUNE 30, 1903.
S. FYFE.
FILLING, CORKING, AND LABELING BOTTLES.
APPLICATION FILED DEC. 3, 1901. RENEWED DEC. 3, 1902.
NO MODEL. 5 SHEETS—SHEET 4.
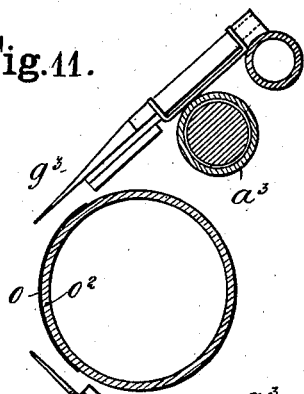
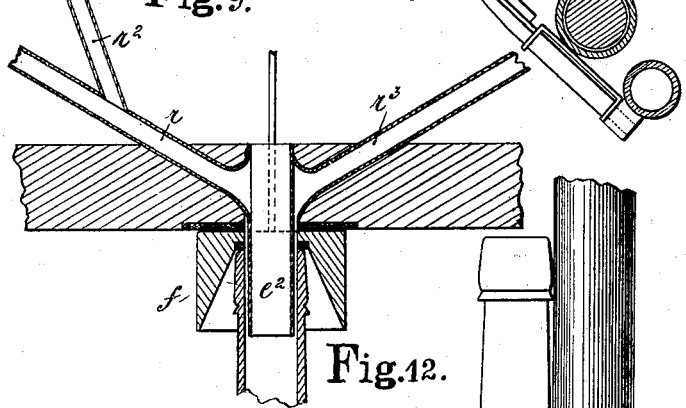
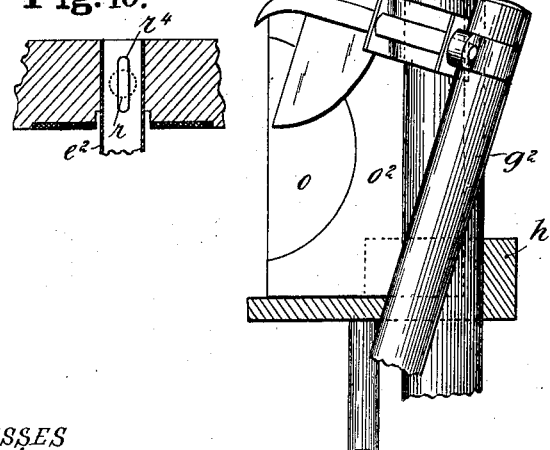
Witnesses
Geo. Fuery
Harry Davis
Inventor
Samuel Fyfe No. 732,539. PATENTED JUNE 30, 1903.
S. FYFE.
FILLING, CORKING, AND LABELING BOTTLES.
APPLICATION FILED DEC. 3, 1901. RENEWED DEC. 3, 1902.
NO MODEL. 5 SHEETS—SHEET 5.

Witnesses. Inventor.
Geo Fury Samuel Fyfe
Harry Davis.

No. 732,539.

Patented June 30, 1903.

UNITED STATES PATENT OFFICE.

SAMUEL FYFE, OF BIRMINGHAM, ENGLAND.

FILLING, CORKING, AND LABELING BOTTLES.

SPECIFICATION forming part of Letters Patent No. 732,539, dated June 30, 1903.

Application filed December 3, 1901. Renewed December 3, 1902. Serial No. 133,776. (No model.)

*To all whom it may concern:*

Be it known that I, SAMUEL FYFE, a subject of the King of Great Britain, residing at 11 Burlington Chambers, New street, Birmingham, England, have invented certain new and useful Improvements in the Filling, Corking, and Labeling of Bottles, of which the following is a specification.

This invention comprises the improvements hereinafter defined by the aid of the accompanying sheets of drawings in the filling, corking, and labeling of bottles, such improvements consisting of the features of construction, arrangements, and combinations of devices hereinafter described, and more particularly pointed out in the claims forming part hereof.

The improvements as aforesaid deal, first, with a cork-feed, a cork-compressor, and a cork-conveyer and fitting therefor, (the latter for placing the cork in the neck of the bottle in a particular way,) which can be either separately or in combination form part of the corking-machine; secondly, with a means of filling bottles, such means to be worked with the cork-conveyer; thirdly, with labeling devices to be combined with the corking or corking and filling, as aforesaid, and, fourthly, with the simultaneous corking or corking and filling of a number of bottles.

Figure 13:
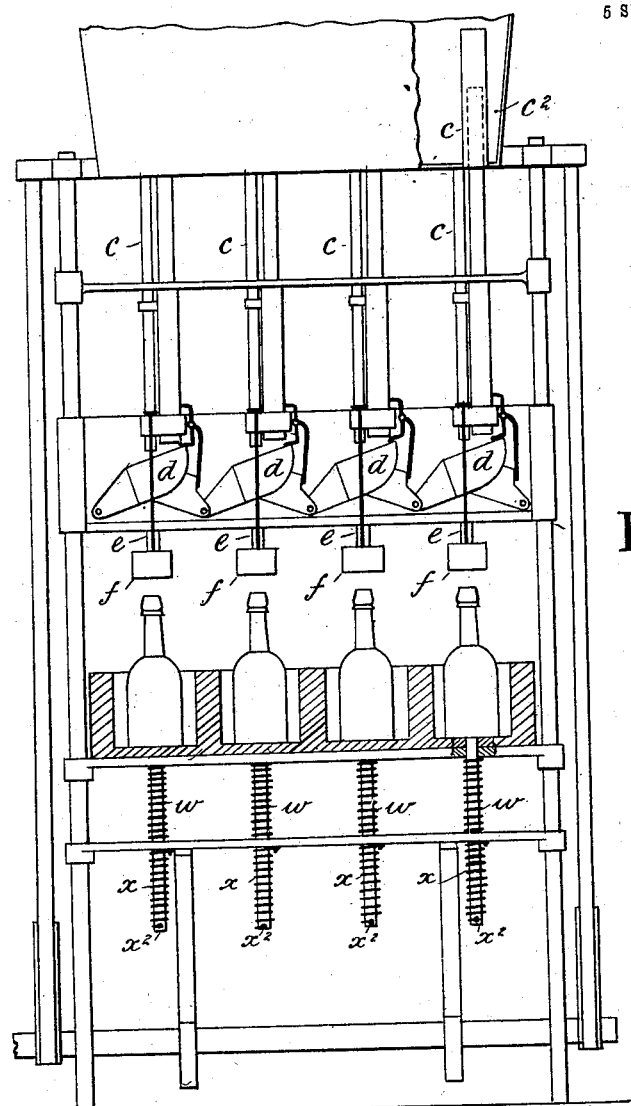
Figure 14:
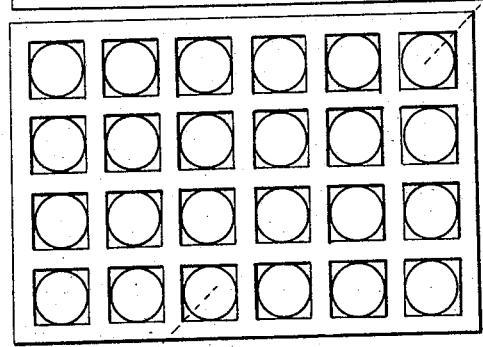

In the drawings, Figure 1 is a sectional side elevation of the machine. Fig. 2 is an end elevation. Fig. 3 is a sectional detail on the line A A of Fig. 1. Fig. 4 is an enlarged sectional side elevation of a portion of the machine, showing the cork-feed, the cork-compressor, the cork-conveyer and its guide, the position of the parts being normal. Fig. 5 is a similar view to that of Fig. 4 with the parts thereof in their operative position. Fig. 6 is a horizontal section on the line B B of Fig. 5. Figs. 7 and 8 are details of the cork-conveyer and its guide. Figs. 9 and 10 are sectional details showing the bottle-filling means. Figs. 11 and 12 are details of the labeling devices. Fig. 13 is a sectional elevation showing the arrangement of the machine for operating upon a number of bottles simultaneously. Fig. 14 is a plan of the bottle-holding tray.

The invention will now be described in connection with the drawings, reference-letters being used to indicate the different parts.

$a$ is the base of the machine, and $a^2$ $a^3$ constitute a vertical frame rising rigidly therefrom, this frame supporting the whole of the parts of a single-acting machine.

Broadly speaking, with reference to Figs. 1 and 2, $c$ is the cork-feed, $d$ the cork-compressor, $e$ the cork-conveyer, and $f$ the cork conveyer's bottle-guide, while $g$ is the labeling means, $h$ the bottle-support, and $i$ the driving means and gear, the latter for communicating motion from a treadle $j$ to those parts of the machine requiring movement.

Proceeding from the top of the machine, the cork-feed $c$ is as follows: A cork container or hopper $c^2$, into which the corks to be fed are loosely bundled, is rigidly carried at the top of rods $c^3$ $c^4$, which are moved up and down in the tubular members $a^3$ of the machine's frame, so that it moves with the said rods over a fixed cork-guide $c^5$, supported upon the machine's frame. This cork-guide is fairly broad but very little thicker than the diameter of a cork (this being shown in Figs. 1 to 3) and is V-shaped at its top edges $c^6$ and has an opening $c^7$ within it of the size of a cork, and its said top edges $c^6$ are sheathed in a sleeve $c^8$, carried by the hopper $c^2$, and which moves up and down over the said cork-guide when the hopper $c^2$ is lowered and lifted by the rods $c^3$ $c^4$. The top edges $c^6$ are concaved, so that corks can slide down them one at a time and pass down the central opening $c^7$, whose lower end $c^9$ communicates with a supply-tube $c^{10}$, down which the corks to be fed pass to the compressor. The lower end of the tube, with a number of corks in it, is clearly shown by Figs. 4 and 5, the outlet $c^{11}$ of the said lower end coming adjacent to the cork-compressor $d$, so as to deliver the corks thereinto. This outlet end $c^{11}$ is provided with a double-acting catch device $m$, pivoted to the machine's frame at $m^2$ and arranged to work so that at one time the upper arm $m^3$ of it holds the lowest cork in the tube $c^{10}$ and at another time the lower arm $m^4$ of it holds the lowest cork in the said tube, this latter being clearly seen by a comparison of Figs. 4 and 5. The catch device operates by a spring $m^6$ and by the cork-compressor acting upon it so that it frees a cork and holds the next above it at one time and at another time holds the lowest cork in the tube $c^{10}$ and frees the next above it, it being understood that the corks fall down the tube $c^{10}$ by gravitation. In Fig. 4 the cork-compressor forces the catch device $m$ into action, while in Fig. 5 the spring brings it into action.

$n$ is the plunger of the corking mechanism, it being carried by the up-and-down moving hopper $c^2$ and rods $c^3 c^4$ and being guided in bearings $n^2 n^3$ of cross-brackets of the machine's frame. The movement of this plunger is utilized, as will be hereinafter defined, for operating the cork-compressor in one direction.

The up-and-down moving rods $c^3 c^4$ are connected at their lower ends $c^{12} c^{13}$ with links $c^{14} c^{15}$, which are jointedly connected to the said lower ends and to toothed wheels $i^2 i^3$, which in turn are rotated by toothed pinions $i^4 i^5$, moved by connecting-rods $i^8 i^9$, suitably connected to the pinions and to a treadle $j$, from which the machine is operated, the toothed wheels being suitably mounted upon the machine's frame and the treadle so jointed to the said frame at $j^2$ as to give an easy working of the rods $c^3 c^4$ in the tubular members of the frame part $a^3$.

The mechanism just described for imparting movement to the rods $c^3 c^4$ from the treadle is simply in duplicate on each side of the tubes forming the members $a^3$ of the frame; but no specific claim is made for this mechanism outside the up-and-down moving rods $c^3 c^4$.

The cork-compressor $d$, clearly illustrated in Figs. 4, 5, and 6, comprises two traveling surfaces $d^2 d^3$, between which the cork to be compressed is delivered and by which the compression of the cork is gradually effected. These traveling surfaces move in the compression of the cork, so that they approach each other gradually and step by step knead the cork from its normal into its fully compressed condition, the shape of the said surfaces being such as to gradually inclose the cork on all sides. In Fig. 4 it will be seen that the compressor is open to the supply-tube $c^{10}$ and that a cork has fallen loosely between the traveling surfaces, while in Fig. 5 the said surfaces have moved to compress the cork to the required degree, the same first acting upon the lowest end of the cork and then step by step to the top of it—in a word, the said surfaces roll the cork from its normal size into a state of compression. In the drawings the surfaces are shown carried by two levers $d^4 d^5$, jointed at $d^6 d^7$ to a stationary part of the machine's frame, the said levers moving so that the surfaces advance and retire as each cork is compressed and forced from the compressor by the plunger $n$. The latter in its descent moves the levers $d^4 d^5$ carrying the traveling surfaces by its lower end $n^4$, impinging upon the top $d^8$ of the lever $d^4$ and forcing it down as it (the said end) slides down the said top to enter a hole $d^9$ in the said top, as shown by Fig. 5, the said lever $d^4$ being connected to the lever $d^5$ by a peg $d^{10}$, which strikes upon the top of the lever $d^5$ to depress it. The levers $d^4 d^5$ are lifted from their position, Fig. 5, to their position as shown in Fig. 4 and are kept in this position by springs $d^{11} d^{12}$, or instead of these springs by the rod $d^{13}$, (shown in dotted lines in Fig. 4,) this rod being connected with the lever $d^5$ and with an adjustable collar $n^5$ on the plunger $n$, so that the said collar as the plunger rises operates and lifts the said rod $d^{13}$ at the right time to lift the lever $d^5$ and through the peg $d^{10}$ the lever $d^4$. The lever $d^5$ acts upon the catch device $m$ in the manner hereinbefore defined through a leg or arm $m^5$, rigidly connected to the said catch device, the said acting being self-evident by a comparison of Figs. 4 and 5.

The cork-conveyer is an open-ended tube $e^2$, depending rigidly from the machine's frame immediately below the cork-compressor and in line with the plunger $n$, the external diameter of the said tube being to freely fit the bottle's neck. This tube is used for carrying the cork from the compressor $d$ into the neck of the bottle without pressure upon the bottle, the objects being to prevent the breakage of bottles and to insure the air between the surface of the liquid and the under side of the cork being at atmospheric pressure only, and, further, to enable the cork to be placed in the bottle's neck in absolute contact with the liquid in the bottle, if desired. In the corking of the bottle the cork from the compressor is, as will be seen by a comparison of Figs. 5 and 7, forced by the plunger from the compression-chamber into the tube $e^2$ at such time as the bottle-neck $e^3$ of the bottle to be corked is in position over the said tube, the said forcing exerting pressure only upon the tube $e^2$ and not on the bottle. The plunger $n$ descends sufficient to force the compressed cork into and through the tube $e^2$, the lower end of the cork immediately it issues from the lower end of the tube expanding into the neck of the bottle and taking a grip thereon in the exact position the cork is intended to be to form the closure, the bottle being gradually lowered from its position, Fig. 7, in the manner hereinafter described as the cork is forced out of the tube $e^2$, it being understood that there is practically no forcing of the cork into the neck of the bottle, but only an expansion of it thereinto from the tube $e^2$. The bottle may for corking only be held by hand with its mouth over the tube $e^2$ and the hand lowered as the bottle descends; but if labeled simultaneously it rests upon the bottle-support $h$, (shown in Figs. 1 and 2,) the said support being a yielding one, as shown. This support is carried upon a tubular bracket $h^2$, sliding up and down over one of the members $a^3$ of the frame, the said bracket being lifted by a cam $h^3$, fast upon and turning with the toothed wheel $i^3$ hereinbefore described, the contact between the said tubular bracket and the cam being by a roller $h^4$. The said tubular bracket lowers by gravitation to always make contact with the periphery of the cam.

The cork-conveyer bottle-guide $f$ is an inverted cup-shaped piece $f^2$, sliding up and down over the cork-conveyer $e^2$, as will be seen from Figs. 7 and 8. This fitting normally covers the lower end of the cork-conveyer, as shown in Fig. 8, and is for the purpose of enabling the mouth of the bottle to at once centralize itself to the cork-conveyer without damaging the said conveyer, as by its use the mouth of the bottle can be dashed haphazard into the hollowing of the inverted cup with a surety that it will find its way over the tube $e^2$. This cup-shaped piece $f^2$ has two thin rods $f^3 f^4$ connected to it, which at their upper ends terminate in an eye or ring $f^5$, sliding loosely up and down on the plunger $n$. These rods serve to guide the said cup-shaped piece in its up-and-down movement upon the tube $e^2$, but in addition form a part of the said piece against which the adjustable collar $n^5$ upon the plunger $n$ acts in the plunger's downward movement to force a lowering of the said cup-shaped piece and a consequent lowering of the bottle, this lowering commencing at the time in the corking operation when the cork commences to expand into the bottle's neck, as shown by Fig. 7.

The labeling means $g$ is for all practical purposes, with the exception of the particular movement, as will be hereinafter described with reference to Figs. 11 and 12, the same as patented under United States Patent No. 628,307, and dated the 4th day of July, 1899, the label-carrying arms being represented in Fig. 1 by $g^2$, the label-carrying disk by $g^3$, the grooves operating the said disk by $g^4$, and the disk-moistening and label-pasting devices by $g^5 g^6$, the said labeling-arms being worked from the treadle $j$ by an arm $g^7$, rigid with arms $g^2$, and a link $g^8$, connecting said arm $g^7$ with the connection means upon the lower end of the up-and-down moving rod $d^4$, it being understood that any suitable labeling means can be used with the improvements in the corking or the corking improvements without the labeling means. With reference to Figs. 11 and 12 the two halves of the label-carrying disk $g^3$ after wiping the label $o$ upon the bottle $o^2$, as in the patent hereinbefore defined, is kept out of contact with the bottle's surface by striking against the two tubes $a^3 a^3$ of the machine's frame, as shown in Fig. 11, until such time as the bottle is lowered, as in Fig. 12, when the two halves of the label-carrying disk again come together by wiping around the waist of the bottle clear of the label previously wiped on.

The means for filling the bottle is shown by Fig. 9, the cork-conveyer tube $e^2$ having discharging into it the liquid-supply $r$. This liquid-supply may have connected to it a gas-feed $r^2$ for aerating liquids. A tube $r^3$ connects outside the cork-conveyer tube $e^2$ with the interior of the bottle when the said bottle makes air-tight connection over the tube $e^2$, as shown in Fig. 10, the said tube $r^3$ being for exhausting the bottle of air and causing a rapid filling. This filling means is not shown in Figs. 1, 2, 3, and 4 in view of the invention being more clearly understood; but it will be obvious that it is easily applied. The mouths of the tubes $r r^3$ are elongated, as shown at $r^4$, Fig. 10.

Figs. 13 and 14 show in diagram how the improvements hereinbefore defined can be carried into effect for the simultaneous corking or corking and filling of a number of bottles, the fundamental feature of the said figures being that, say, two dozen bottles can in a tray be treated in a duplicated machine. Fig. 14 simply shows a plan of the tray for holding the bottles; but Fig. 13, which is a diagonal section across the tray, shows sufficiently in diagram how the duplication can be effected. In Fig. 13 $c^2$ is the cork-container; $c\ c\ c\ c$, the cork-feeds; $d\ d\ d\ d$, the cork-compressors; $e\ e\ e\ e$, the cork-conveyers; and $f f f f$, the cork-conveyer's bottle-guides. The filling is not applied for clearness, but is just in accordance with Fig. 9. Compensating arrangements are provided to support the tray carrying the bottles in view of bottles of different lengths and other variable details which are likely to be met in such machine, such arrangements consisting of springs $w\ w\ w\ w$, supporting the tray carrying the bottles, and springs $x\ x\ x\ x$, supporting resiliently rods $x^2 x^2 x^2 x^2$, passing through the said springs and impinging against the under sides of the bottles. If any bottles in the tray are longer than others, the tray lowers automatically by the springs $w$, while the short-length bottles rise automatically by the rods $x^2$.

The action of the single machine is as follows: The bottle to be filled, corked, and labeled is placed upon the bottle-support $h$, which immediately rises through the cam $h^3$, so that the mouth of the bottle strikes the cup-shaped piece $f$ and forces it upward, while at the same time the said mouth slips over the cork-conveyer $e$ in the manner shown by Fig. 9. The filling of the bottle with liquid then takes place, during which time the cork has dropped into the compressor $d$ from the cork-feed and is being compressed. The supply of liquid is next shut off and the cork is forced by the plunger $n$ into the cork-conveyer $e$ and into the bottle's neck, while at the same time the labeling means operates to wipe the label on the bottle, it being understood that the filling of the bottle with liquid is very rapid, owing to the air being withdrawn therefrom by the exhausting device.

Having now described my invention, what I claim, and desire to secure by Letters Patent, is—

1. In a machine for corking bottles, the combination of a cork-compressor formed by two traveling surfaces acting in unison to knead or roll the cork gradually between them from its normal size to a state of compression, a cork-conveyer to receive the cork from the compressor and place it in the neck of the bottle without pressure on the bottle, and a suitable plunger engaging the compressor directly to operate it to compress the cork and then forcing the cork from the compressor into the cork-conveyer and from the conveyer into the bottle, substantially as described.

2. In a machine for corking bottles, the combination of a cork-compressor having traveling surfaces for kneading or rolling the cork into a state of compression, a plunger directly engaging the cork-compressor to operate it and compress the cork and then force the cork from the compressor, and a cork-conveyer into which the cork from the compressor is forced and by which, with the aid of the plunger, the said cork is placed in the bottle's mouth without pressure, substantially as described.

3. In a machine for corking bottles, the combination of a compressor having traveling surfaces between which the cork is compressed, a cork-conveyer to receive the cork from the compressor and introduce it into the bottle without pressure on the bottle, a plunger operating the compressor in one direction and forcing the compressed cork from the compressor into the conveyer and from the conveyer into the bottle, a cup-shaped piece working on the conveyer, and connections between the plunger and the cup-shaped piece for forcing the latter down at a predetermined time by the plunger, substantially as described.

4. In a machine for corking bottles, compressing mechanism, a plunger directly engaging with said mechanism for operating it to compress the cork and for forcing the cork therefrom into a bottle, in combination with a cork-feeding mechanism for said compressing mechanism consisting of a cork-guide provided with a V-shaped recess terminating in an opening, a supply-tube communicating with said opening, a vertically-operating sleeve surrounding the upper end of said guide, and a vertically-moving hopper for receiving the corks and connected to the said sleeve for operating it.

5. In a machine for corking bottles, the combination of a cork-feed, a cork-compressor comprising a pair of traveling surfaces for compressing the cork, a cork-conveyer by which the compressed cork is placed into the neck of a bottle without pressure on the same, and a plunger adapted in its descent to directly engage with the said compressor for operating the said surfaces to compress the cork and then to force the cork therefrom through the conveyer into the bottle.

6. In a machine for corking bottles, a vertically-operating bottle-support, a fixed cork-conveyer adapted to receive the cork, a vertically-operating bottle-guide mounted upon said conveyer, a plunger for forcing the cork from the conveyer into the bottle and connections between the plunger and guide for suitably operating the latter.

7. In a machine for filling and corking bottles, a movable support for the bottle, a cork-conveyer, a bottle-guide movably mounted thereon, and means for ejecting the cork from the conveyer and operating said guide, in combination with means communicating with the conveyer for withdrawing air from the bottle and supplying liquid thereto.

8. In a machine for corking bottles, a cork-compressor mechanism consisting of two traveling surfaces acting in unison to knead or roll the cork gradually between them from its normal size to a state of compression, means for supplying corks to the mechanism, means operated by the compressor mechanism for regulating the feeding of the corks from the supply means to the compressor mechanism, and a plunger engaging with and suitably operating said compressor mechanism to compress the corks and then force the corks therefrom into the bottles.

9. In a machine for corking bottles, a cork-compressor mechanism consisting of two traveling surfaces acting in unison to knead or roll the cork gradually between them from its normal size to a state of compression, means for supplying corks to the mechanism, means operated by the compressor mechanism for regulating the feeding of the corks from the supply means to the compressor mechanism, a cork-conveyer communicating with the said compressor mechanism, and a vertically-operating plunger directly engaging said compressor mechanism for operating it to compress the cork and then forcing the cork therethrough and through the conveyer into the bottle.

10. In a machine for corking bottles, a cork-compressor mechanism consisting of two traveling surfaces acting in unison to knead or roll the cork gradually between them from its normal size to a state of compression and means for returning the traveling surfaces to an inoperative position, means for supplying the corks to the compressor mechanism, means operated by the compressor mechanism for regulating the feeding of the corks from the supply means to the compressor mechanism, and a vertically-moving plunger directly engaging said compressor mechanism for operating it in one direction to compress the corks and for forcing the corks therefrom into the bottle.

11. In a machine for corking bottles, a spring-actuated compressor mechanism adapted to receive the corks for compressing them, means operated by the compressor mechanism for supplying the corks thereto one at a time, and a plunger directly engaging with and operating the said compressor mechanism in one direction to compress the corks and then forcing the compressed corks therefrom into the bottle.

12. In a machine for corking bottles, a movable hopper, a supply-tube, means extending in the hopper for feeding the corks to the supply-tube, a compressing mechanism adapted to receive the corks for compressing them, a feed mechanism operated by the compressor mechanism for delivering the corks thereto one at a time from said tube, a conveyer communicating with the compressor mechanism, and means for operating the said compressor mechanism to compress the corks and for forcing the corks therefrom through the conveyer into the bottle.

13. In a machine for corking bottles, a movable support for the bottle, a compressor mechanism, means for supplying the corks thereto one at a time and adapted to be operated by said compressor mechanism, a conveyer-tube communicating with the compressor mechanism, a movable bottle-guide mounted upon said conveyer-tube, a plunger adapted to operate said compressor mechanism and to force the corks therefrom through the said tube into the bottle, and connections between the bottle-guide and said plunger for suitably operating it.

14. In a machine for corking bottles, the combination of a mechanism for compressing the corks, of a supply means for the corks, means for feeding the corks one at a time from the supply means to the compressor, means for retaining the remaining corks within the supply means while the compressor is being fed with a single cork, and a plunger for forcing the cork from the compressor means into the bottle and during its descent adapted to directly engage the compressor mechanism for operating it to compress the cork.

In testimony whereof I have hereunto set my hand in presence of two subscribing witnesses.

SAMUEL FYFE.

Witnesses:
 ALBERT NEWEY,
 HARRY DAVIS.